United States Patent [19]

Yamashita et al.

[11] Patent Number: 4,924,357
[45] Date of Patent: May 8, 1990

[54] LIGHT SOURCE UNIT FOR A BUSINESS MACHINE

[75] Inventors: Hiroshi Yamashita, Osaka; Kanenaga Fujii, Hyogo; Takumi Fukunishi, Kanagawa; Masafumi Shigeoka, Kanagawa; Hiroshi Sudo, Kanagawa, all of Japan

[73] Assignees: Japan as represented by Director General of Agency of Industrial Science and Technology; Nippon Silica Glass Co., Ltd.; Kondo Sylvania Ltd., all of Tokyo, Japan

[21] Appl. No.: 344,390

[22] Filed: Apr. 28, 1989

Related U.S. Application Data

[63] Continuation of Ser. No. 87,568, filed as PCT JP86/00218 on Apr. 30, 1986, published as WO87/03968 on Jul. 2, 1987, abandoned.

[30] Foreign Application Priority Data

Dec. 17, 1985 [JP] Japan .................................. 60-284115

[51] Int. Cl.⁵ ................................................ F21V 8/00
[52] U.S. Cl. .......................................... 362/32; 355/67; 355/229; 362/217
[58] Field of Search ................ 362/31, 32, 217, 812; 355/67, 229; 350/96.15, 96.18

[56] References Cited

U.S. PATENT DOCUMENTS

| | | | |
|---|---|---|---|
| 4,128,332 | 12/1978 | Rowe | 355/67 |
| 4,140,385 | 2/1979 | Shaw et al. | 355/3 R |
| 4,186,431 | 1/1980 | Engel et al. | 362/223 |
| 4,561,043 | 12/1985 | Thompson | 362/32 |

FOREIGN PATENT DOCUMENTS

| | | |
|---|---|---|
| 52-34868 | 9/1977 | Japan . |
| 54-94325 | 9/1979 | Japan . |
| 57-63321 | 4/1982 | Japan . |
| 60-118806 | 6/1985 | Japan . |
| 62-63702 | 4/1987 | Japan . |
| 62-63703 | 4/1987 | Japan . |

*Primary Examiner*—Martin P. Schwadron
*Assistant Examiner*—Allen J. Flanigan
*Attorney, Agent, or Firm*—Wenderoth, Lind & Ponack

[57] ABSTRACT

A light transmitting rod (22) on an end surface of which is disposed a reflecting mirror (26) and on the other end surface of which is mounted a lamp (44) as a light source for emitting light into the light transmitting rod (22) is attached to a base (12), and a diffusion stripe (24) is formed by applying fine powder having a high refractive index to the outer circumferential surface of the light transmitting rod (22) in a rectilinearly pin-striped manner along the axial direction thereof, whereby an even linear light profile of high luminous energy level and having uniform luminous energy as well as no polarization which is also irradiation light having a small light distribution beam angle and being substantially parallel rays can be obtained. As a result, it is possible to provide a light source unit used suitably in business and office machines such as an image scanner, an optical printer, a monochromatic copying machine, a color copying machine, a facsimile machine and the like.

6 Claims, 9 Drawing Sheets

LIGHT SOURCE UNIT FOR A BUSINESS MACHINE

This application is a continuation of now abandoned application, Ser. No. 07/087,568 filed as PCT JP86/00218 on Apr. 30, 1986, published as WO87/03968 on Jul. 2, 1987.

BACKGROUND OF THE INVENTION

1. Field of the Invention

The present invention relates to a light source unit, and particularly to a light source unit suitable for use as light sources in business and office machines such as an image scanner, an optical printer, a monochromatic copying machine, a color copying machine, a facsimile machine and the like.

2. Description of the Prior Art

As the light source for business and office machines such as an image scanner, an optical printer, a monochromatic copying machine, a color copying machine, a facsimile machine and the like, desirable are those from which it is possible to obtain an even linear light profile of uniform luminous energy and of no polarization and light which is also irradiation light having a small light distribution beam angle and of substantially parallel rays in order to improve resolution and read rate.

Heretofore, a light source unit wherein a tubular electric lamp of a so-called double-ended type is disposed inside a reflecting mirror has been generally used as one complying with the above described desire for business and office machines such as scanners and the like. The tubular electric lamp is secured at a prescribed position after the focal point is adjusted inside the reflecting mirror.

In the above construction, when the power switch is turned on, the light emitted from the tubular electric lamp is reflected by the reflecting mirror, whereby the light is irradiated on the focal point established at a prescribed position.

In case of degradation failure of a tubular electric lamp as a result of service thereof, the electric lamp is removed from the reflecting mirror, and a fresh tubular electric lamp is again secured at the prescribed position after the focal point is adjusted inside the reflecting mirror.

However, since such a conventional light source, unit utilizes a tubular electric lamp of double-ended type, it is very difficult to obtain an even linear light profile of uniform luminous energy and of no polarization and light which is also irradiation light having a small light distribution beam angle and being composed of substantially parallel rays.

Furthermore, the resulting unit becomes oversized because of employment of such a tubular electric lamp, so that it is difficult to use the unit in a place where there is insufficient space. In addition, since it is required to keep the light transmitting length comparatively long, the design voltage for the electric lamp becomes high. Thus, it is necessary to provide insulating material in order to favorably maintain an insulated condition, and besides there is danger in handling such an electric lamp. Moreover, there is the added disadvantage of requiring a long period of time for exchanging the electric lamp, because the focal point must be adjusted again inside the reflecting mirror at the time when the tubular electric lamp is exchanged.

Still further, a conventional light source unit utilizing a tubular electric lamp exhibits poor irradiation efficiency so that power consumption increases (In general, about 200W–500W), and the resulting irradiation light contains infrared rays so that it results in either thermal degradation of the unit or copying papers, or poor condensing efficiency.

From the practical point of view, it is also very difficult to prepare a light source unit in continuous form from a tubular electric lamp of the double-ended type.

SUMMARY OF THE INVENTION

In view of the above, the present inventor's Japanese Patent Application No. 226571/1983 has been applied to the present invention to obtain a light source unit from which an even linear light profile of uniform luminous energy and of no polarization and light which is also irradiation light having a small light distribution beam angle and being substantially parallel rays can be obtained, the whole construction of which may be miniaturized, the light transmitting length of which can be increased at a low voltage, in which the time for exchanging the electric lamp can be shortened, the power consumption of which may be reduced, by which infrared rays can be removed from the irradiation light, and in which a light source in continuous form can be fabricated. In other words, the present invention contemplates the provision of a light source unit comprising a base to be attached to an apparatus, a light transmitting rod carried over said base and provided with a reflecting mirror at an end surface thereof, a diffusion stripe formed by applying fine powder having a high refractive index to the outer circumferential surface of said light transmitting rod in a rectilinearly pin-striped manner along the axial direction thereof, and a lamp mounted on the other end of said light transmitting rod and emitting light onto said other end thereof.

In the light source unit according to the present invention, the light entering an end surface of the light transmitting rod is reflected by the diffusion strip to be emitted in the opposite direction thereto, whereby irradiation light is produced.

According to the light source unit of the present invention, a desired light distribution beam angle of the light transmitting rod on which has been applied the diffusion stripe as well as a desired outgoing light beam width of the irradiation light on the surface of the light transmitting rod (the width of primary light beam on the surface of the light transmitting rod) can be obtained by adjusting the diameter of said light transmitting rod and the stripe width of said diffusion stripe. In this respect, the light distribution beam angle decreases with an increase in the diameter of the light transmitting rod as well as a decrease in the stripe width of the diffusion stripe. Furthermore, said outgoing light beam width becomes substantially the same as the stripe width.

DETAILED DESCRIPTION OF THE PREFERRED EMBODIMENTS

The light source unit according to the present invention will be described in detail hereinbelow by referring to the accompanying drawings.

Figure 5:
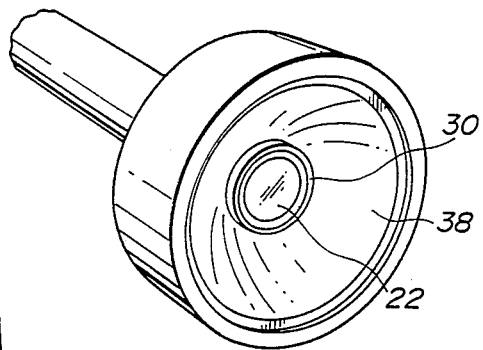
FIG. 5 is a perspective view showing a state where a reflector is attached to the lighting subunit.
Figure 6A:
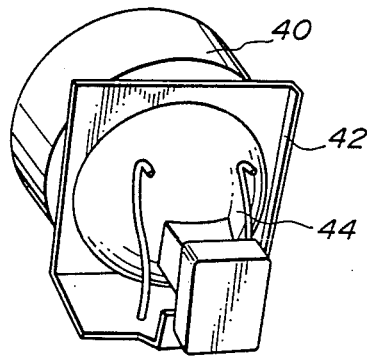
FIGS. 6A and 6B are perspective views each showing a state where a lamp is mounted to a lamp mount.
Figure 6B:
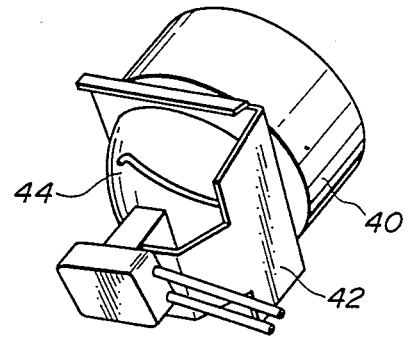

FIG. 1, FIG. 2, FIG. 3, FIGS. 4A, B, C, FIG. 5 and FIGS. 6A, B illustrate an example of the present invention wherein a light source unit 10 is installed on a body or a certain apparatus a such as a scanner or the like, on which is to be mounted such light source unit, by means of a suitable fixing means such as machine screws, bolts and the like. Supporting arms 14L and 14R are vertically disposed on the opposite sides of a base 12, and holes 16L, 18L as well as 16R, 18R are bored in the respective supporting arms 14L and 14R at opposite positions to each other in the respective vertical directions.

A lighting subunit 20 is rotatably suspended between said holes 16L and 16R. The lighting subunit 20 is coated with fine powder having a high refractive index in such a manner that said fine powder is applied on the outer circumferential surface of a light transmitting rod 22 for transmitting light incident from one end thereof towards the other end in rectilinearly pin-striped fashion along the axial direction thereof to form a diffusion stripe 24. In addition, one end surface of said lighting subunit is provided with a reflecting mirror 26 having a reflecting surface inside the light transmitting rod 22. Opposite ends of an aluminum cylindrical mirror 30 with a slit 28 at a position opposed to said diffusion stripe 24 are covered with and secured by supports 32 with a slight gap 34, whereby the outer circumferential surface of the light transmitting rod 22 is protected.

The light transmitting rod 22 is solid and has a circular section. A suitable material of rod 22 is one which has as high a transparency as possible and favorable light resistance. For example, a silica glass rod, an optical glass rod, a silicone resin rod, an acrylic resin rod and the like may be used as the material for said light transmitting rod.

The diffusion stripe 24 is made of fine powder having a higher refractive index than that of the light transmitting rod 22 and favorable light resistance and examples of which include barium sulfate, magnesia, titania and the like.

As a manner for applying the fine powder to the light transmitting rod 22 in a striped pattern, binding the fine powder with a light-resisting, clear binder such as silicone resin, adhesively bonding a silicone resin molding material into which is dispersed and included the fine powder by using a clear adhesive of silicone resins or the like manner may suitably be selected.

Figure 1:
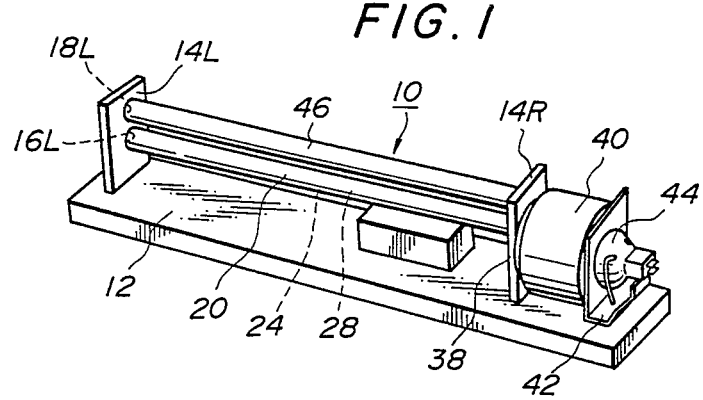
FIG. 1 is a perspective view illustrating the first embodiment of the present invention.
Figure 2:
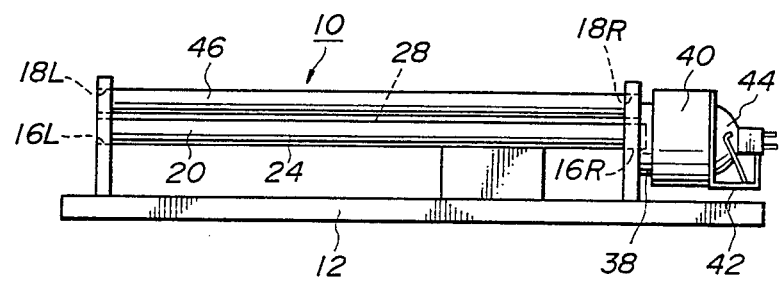
FIG. 2 is a side view of FIG. 1.
Figure 3:
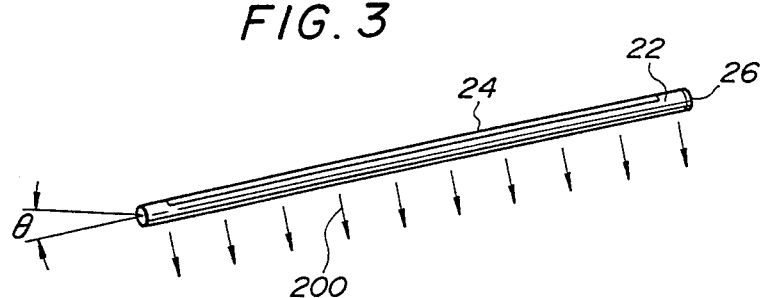
FIG. 3 is a perspective view showing a light transmitting rod.
Figure 7A:
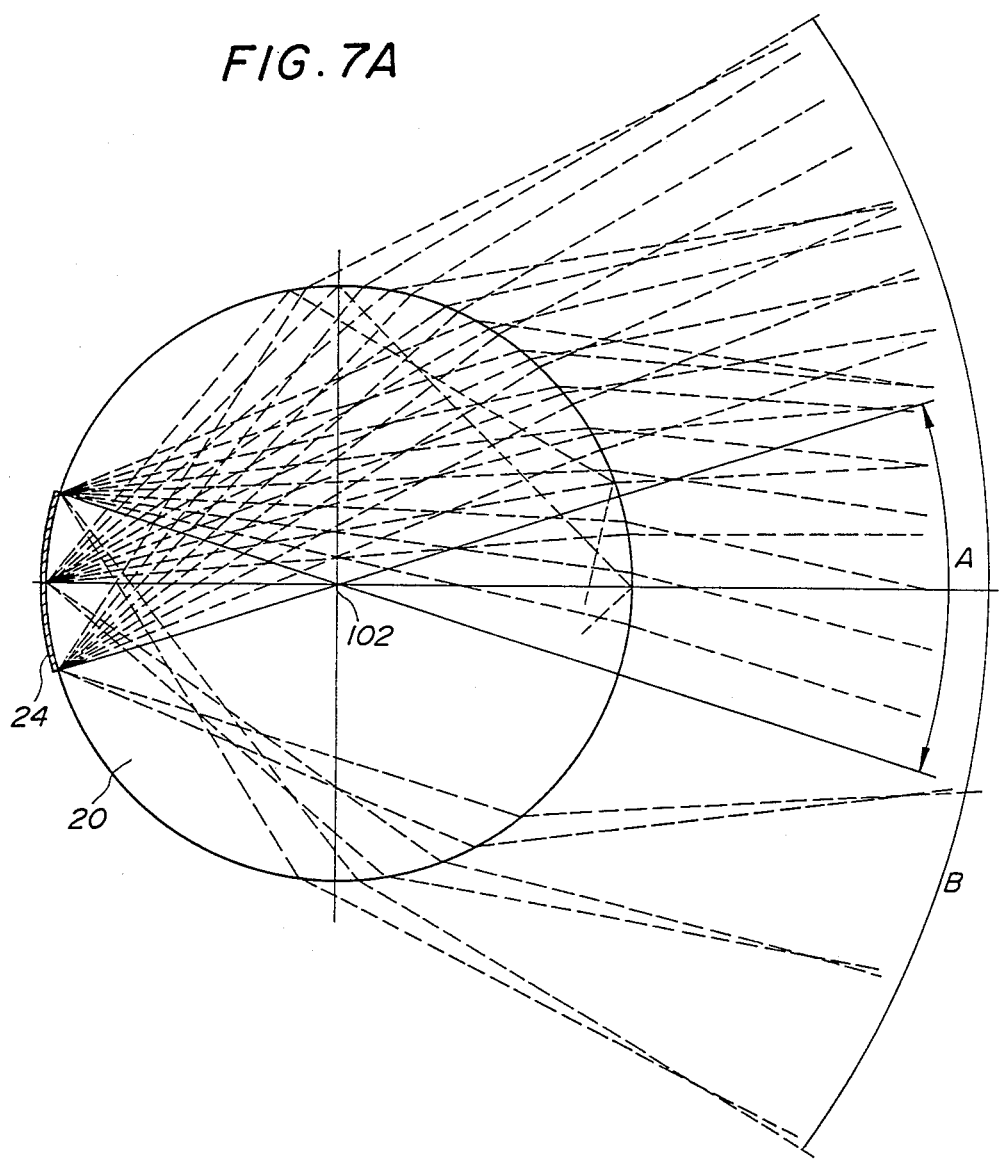
FIG. 7A is an explanatory diagram indicating the principle of the lens function of a light transmitting rod.

Light can be introduced from the end surface, which does not include the reflecting mirror 26, of the light transmitting rod 22 which has not been covered with the cylindrical mirror 30 (having a slit to the interior of said light transmitting rod 22 at an angle of incidence $\theta$ = about 30° with respect to the optic axis) by collecting the light from a light source such as a tungsten halogen lamp, a mercury lamp, a xenon lamp, a flash lamp or the like and the light is transmitted in the axial direction while repeating total reflection in the light transmitting rod 22. The light transmitted to said reflecting mirror 26 is reflected thereby. Since the diffusion stripe 24 made of the fine powder having a high refractive index is formed on the outer circumferential surface of the light transmitting rod 22 along the axial direction thereof, the light transmitted through the light transmitting rod 22 and the light reflected by the reflecting mirror 26 are subjected to diffuse reflection into the light transmitting rod 22 by means of the diffusion stripe 24. Furthermore, the resulting light is emitted by the lens function of said light transmitting rod 22 in a direction opposite to the diffusion stripe 24. In FIG. 3, arrow 200 indicates a light emitting direction. FIG. 7A is an explanatory view showing the principle of the lens function of the light transmitting rod 22 wherein the diffusion stripe 24 functions as a circular arc diffusion reflecting mirror which closely contacts the outer circumferential surface of the light transmitting rod 22.

Accordingly, an outgoing component which was once collected at a central axis 102 of the light transmitting rod 22 among such diffused light being diffused and reflected by means of the reflecting mirror action of the diffusion stripe 24 due to directive characteristics involved in the circular arc shape of the diffusion stripe 24 and another component involving a range overlapping an outgoing component which was collected once at said central axis 102 among such emitted light which is concentrated in the direction opposite to the diffusion stripe 24 by a decreasing angle of the other diffused light which does not converge upon the central axis 102 by means of the function of the light transmitting rod 22 are synthesized and incorporated to compose a primary light beam A having a large luminous energy level. As a result, a secondary light beam B having a small luminous energy level is composed of the diffused light components other than those composing said primary light beam A. Furthermore, such incident light which is not emitted from the light transmitting rod 22 repeats total reflection in the light transmitting rod 22 and is diffused and reflected again by the diffusion stripe 24 to be emitted outside the light transmitting rod 22. Thus, the transmitted and reflected light in the light transmitting rod 22 is emitted successively by means of the diffusion stripe 24 in directions along said diffusion stripe and opposite to that side to which has been applied the diffusion stripe 24 in the course of such transmission and reflection, so that a linear light profile having uniform luminous energy can be obtained. Furthermore, since the lens function of the light transmitting rod 22 differs dependent upon the wavelength of the light, the visible radiation component has a distinctive direction, while components from near infrared rays to infrared rays exhibit obscure directions so that the latter components are diffused, whereby harmful heat wave radiation can be avoided.

Figure 7B:
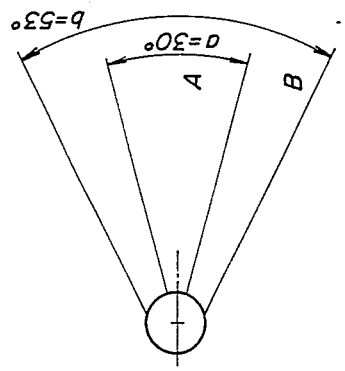
FIGS. 7B(a), (b), and (c) are explanatory diagrams each showing a primary beam angle and a secondary beam angle.
Figure 7B:
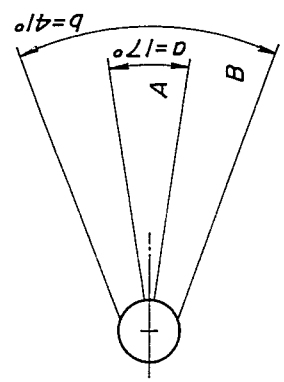
Figure 7B:
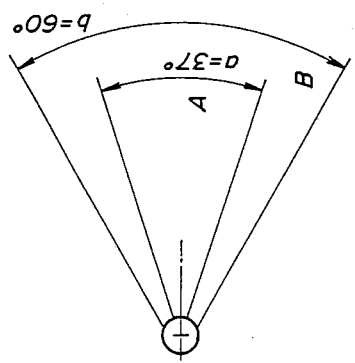

As a result of applicant's experiment, it has been confirmed that the light emitted from the light transmitting rod 22 which has not been covered with the cylindrical mirror 30 with a slit is dispersed into primary light beam A having a high luminous energy level and being useful for a light source in business and office machines and secondary light beam B having a low luminous energy level as shown in FIGS. 7B(a), (b), and (c) where, in FIG. 7B(a),
Material of Rod: Silica Glass
Diameter of Rod: 6 mm$\phi$
Length of Rod: 240 mm
Material of Diffusion Stripe: Titania Fine Powder
Width of Diffusion Stripe: 2 mm
Type of Light Source: Tungsten Halogen Lamp
Primary Beam Angle: ca. 37°
Secondary Beam Angle: ca. 60°,
in FIG. 7B(b),
Material of Rod: Silica Glass
Diameter of Rod: 10 mm$\phi$
Length of Rod: 300 mm
Material of Diffusion Stripe: Titania Fine Powder
Width of Diffusion Stripe: 1.7 mm
Type of Light Source: Tungsten Halogen Lamp
Primary Beam Angle: ca. 17°
Secondary Beam Angle: ca. 41°, and
in FIG. 7B(c),
Material of Rod: Silica Glass
Diameter of Rod: 10 mm$\phi$
Length of Rod: 300 mm
Material of Diffusion Stripe: Titania Fine Powder
Width of Diffusion Stripe: 2.8 mm
Type of Light Source: Tungsten Halogen Lamp
Primary Beam Angle: ca. 30°
Secondary Beam Angle: ca. 53°.

Figure 8:
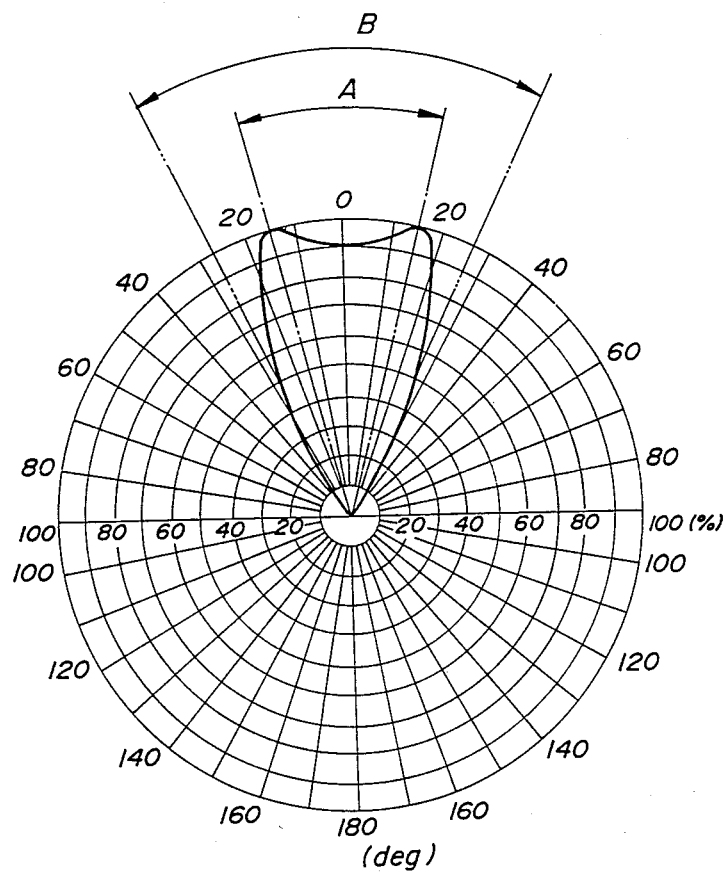
FIG. 8 is a diagram indicating measured results of luminous intensity distribution characteristics represented by circle coordinates along the direction of the axis of the light transmitting rod.

Measured results of luminous intensity distribution characteristics with respect to the illuminating light along the direction of the axis of said light transmitting rod 22 (the light emitted from the light transmitting rod 22) were obtained as shown in the circular coordinates of FIG. 8 where
Material of Rod: Silica Glass
Diameter of Rod: 10 mm$\phi$
Length of Rod: 240 mm
Material of Diffusion Stripe: Titania Fine Powder
Width of Diffusion Stripe: 2.8 mm
Type of Light Source: Tungsten Halogen Lamp
Measured Distance: 15 mm.

Figure 9:
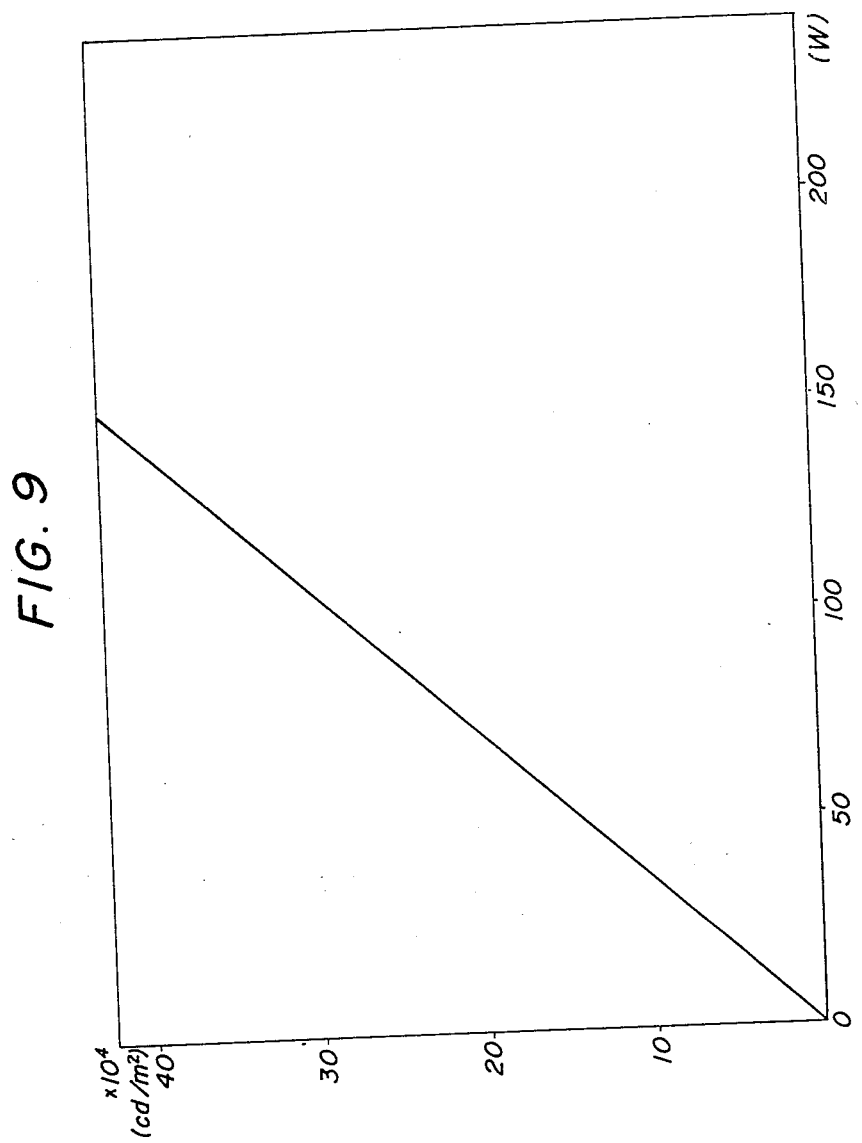
FIG. 9 is a diagram indicating luminance level with respect to wattage of an incoming light source.

Furthermore, FIG. 9 is a graphical representation indicating luminance level with respect to wattage of luminous energy measured by a luminance meter where
Material of Rod: Silica Glass
Diameter of Rod: 10 mm$\phi$
Length of Rod: 320 mm
Material of Diffusion Stripe: Titania Fine Powder
Width of Diffusion Stripe: 2.8 mm
Type of Light Source: Tungsten Halogen Lamp.

Figure 10:
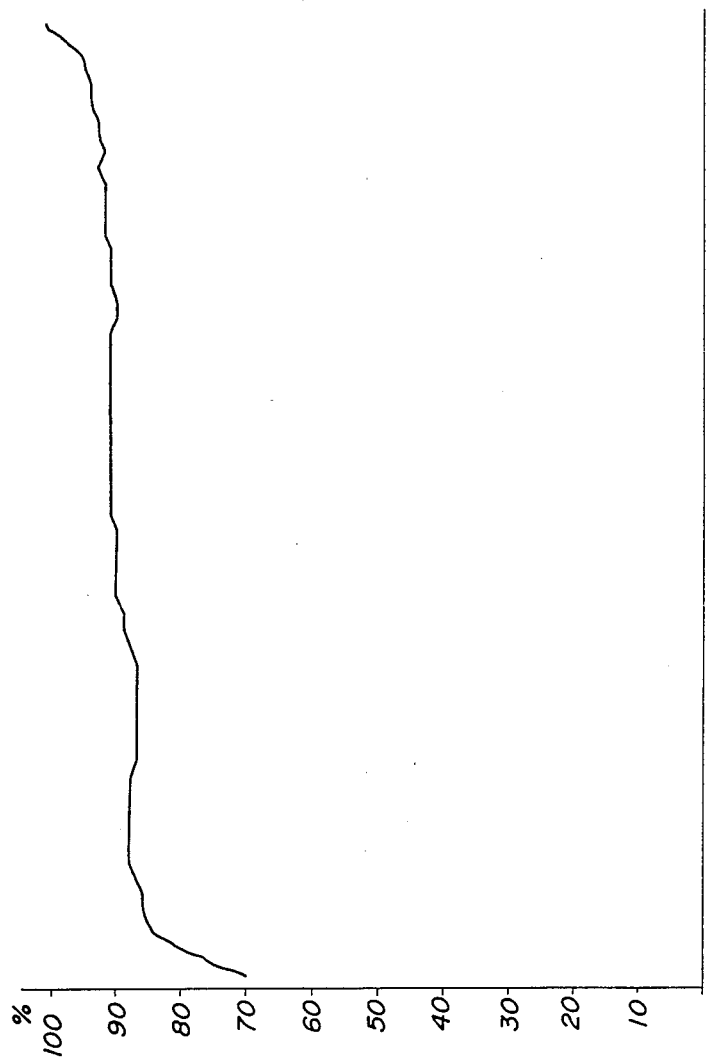
FIG. 10 is a diagram indicating nonuniform characteristics of luminous energy.

In addition, as a result of measuring nonuniformity of luminous energy of a primary light beam along the direction of the axis of the light transmitting rod 22, an even, linear light profile of very uniform luminous energy can be obtained as shown in FIG. 10 where
Material of Rod: Silica Glass
Diameter of Rod: 10 mm$\phi$
Length of Rod: 320 mm
Material of Diffusion Stripe: Titania Fine Powder
Width of Diffusion Stripe: 2.8 mm
Type of Light Source: Tungsten Halogen Lamp
Measured Distance: 5 mm.

As a result of the experiments illustrated in FIGS. 7B(a), (b), and (c), it has been found that the following formulae may be expressed with respect to a relationship between an outgoing angle of a primary light beam (hereinafter referred to simply as "primary beam angle") "a" as well as an outgoing angle of a secondary light beam (hereinafter referred also to simply as "secondary beam angle") "b" of the light transmitting rod 22 which has not been covered with the cylindrical mirror 30 with a slit and to which has been applied the diffusion stripe 24 and a diameter of the light transmitting rod:

Primary Beam Angle (deg.) = 2 sin$^{-1}$ (width of diffusion stripe/diameter in section of light transmitting rod)

Secondary Beam Angle (deg.) = Primary Beam Angle + 23°.

Namely, it is possible to obtain a light of substantially parallel rays having a small primary beam angle with an increase in diameter of the light transmitting rod 22 and a decrease in width of the diffusion stripe 24, while a desired primary beam angle can be obtained by adjusting the diameter of the light transmitting rod 22 and the width of the diffusion stripe 24.

Moreover, the outgoing width C of such primary light beam from the light transmitting rod 22 (width of primary light beam on the surface of the light transmitting rod 22) was substantially the same as the stripe width of the diffusion stripe 24.

Since it is desirable that a primary beam angle is approximately 15° from the practical point of view, it is advantageous to use a light transmitting rod 22 having a diameter of 10 mm$\phi$ and a diffusion stripe 24 having a width of 1.5 mm.

Although the width of the slit 28 is substantially the same as that of the diffusion stripe 24, the slit 28 has a somewhat wider width than that of the diffusion stripe 24, whereby a secondary light beam is reflected inside the light transmitting rod 22 by means of the cylindrical mirror 30 with a slit to return to the diffusion stripe 24. The light beam returned is utilized again as the primary light beam to emit only such primary light beam which is useful as a light source of a business and office machine.

As the support 32, any material having light-resistance and mechanical strength of a proper degree such as a fluoroplastic material may be used.

To the end surface of the light transmitting rod 22 opposite to that provided with the reflecting mirror 26 is attached a reflector 38 having a reflecting surface for returning again such scattered light other than effective incident light directing to the light transmitting rod 22 to the reflecting mirror of a lamp 44. A lamp mount 40 is disposed on the reflector 38, and a lamp holder 42 is mounted on the lamp mount 40, whereby the lamp 44 is detachably held by means of an elastic member of the lamp holder 42 to secure the former. As the lamp 44, a tungsten halogen lamp, a xenon lamp, and a flash lamp or the like may be used, and in the present example, a tungsten halogen lamp with a reflecting mirror is employed as the lamp 44.

Furthermore, a rod lens 46 is suspended between the holes 18L and 18R positioned over the holes 16L and 16R as a condenser for condensing the primary light beam A emitted from the light transmitting rod 22 in the case when the diffusion stripe 24 is positioned at a lower position and the slit 28 is positioned at an upper position. As the condenser, of course, a cylindrical lens, a reflecting mirror or the like may be used other than a rod lens.

In the above construction, when the lamp 44 is lit, the light emitted from the lamp 44 enters into the end surface of the light transmitting rod 22 either directly or through the reflector 38 while converging said light. Only the primary light beam A of the incident light enters the rod lens 46 by means of the diffusion stripe 24 through the slit 28. The primary light beam A is further condensed by the rod lens 46, whereby such light is irradiated as uniform linear light involving even luminous energy and of substantially parallel rays.

The secondary light beam B is reflected by the cylindrical mirror 30 with a slit to reach the diffusion stripe 24 in the light transmitting rod 22, whereby the resulting light is again utilized as a primary light beam.

In order to change the irradiating direction of the primary light beam A, it is sufficient to rotate the lamp subunit 20.

In case of exchanging the lamp 44, the elastic material of the lamp holder 42 is released to disengage the lamp 44, and then a new lamp may be secured by means of the elastic member of the lamp holder 42.

Figure 11A:
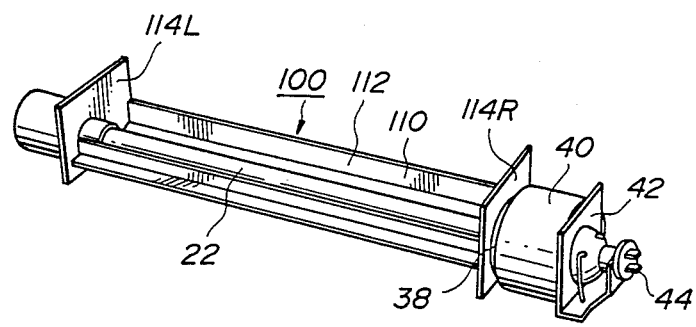
FIG. 11A is a perspective view illustrating a second embodiment of the present invention.
Figure 11B:
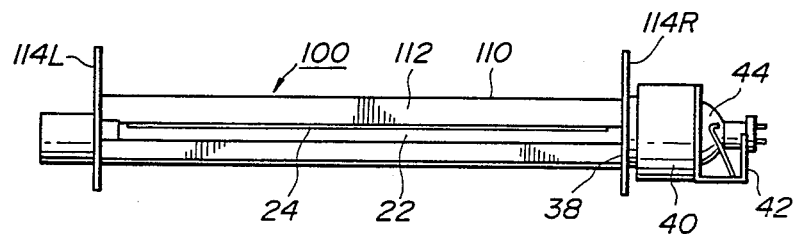
FIG. 11B is a front view of FIG. 11A.

FIGS. 11A and B illustrate a second embodiment of the present invention wherein a condenser is utilized as a reflector and in which like parts are shown by corresponding reference characters throughout the several views as in the first embodiment, so that a duplicate explanation relating thereto is omitted. In a light source unit 100, a light transmitting rod 22 is suspended between supporting arms 114L and 114R disposed vertically on the opposite sides of a base 110. The inner surface of the base 110 forms a reflecting mirror 112 having quadratic surfaces in section.

In the above construction, the light emitted from a light transmitting rod 22 is condensed by means of the reflecting mirror 112 to be irradiated to a prescribed position.

Figure 4A:
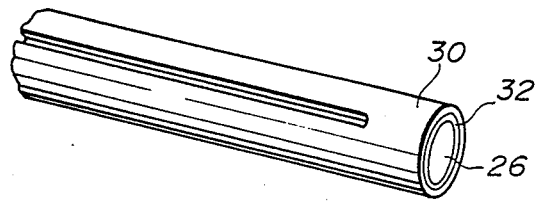
FIGS. 4A and 4B are perspective views showing each opposite end surface of a lighting subunit.
Figure 4B:
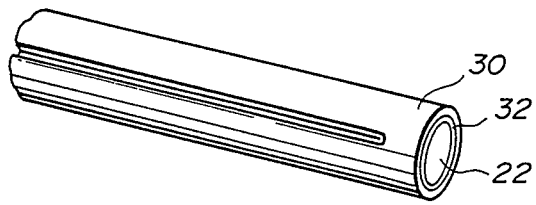
Figure 4C:
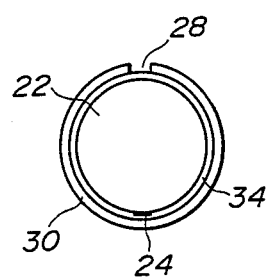
FIG. 4C is a sectional view of FIGS. 4A and 4B, and FIGS. 4D and 4E are sectional views each illustrating another example of the lighting subunit.
Figure 4D:
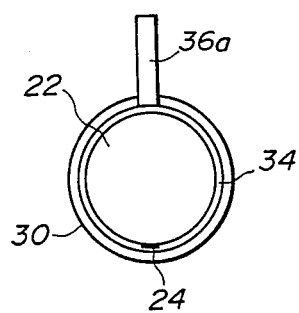
Figure 4E:
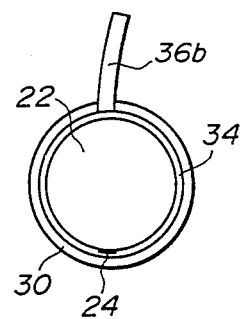

Furthermore, FIGS. 4D and E illustrate other examples of the lighting subunit 20, respectively, wherein light guides 36a and 36b made of plate glass, acrylic resin or the like are fitted into slits 28.

The primary light beam emitted from the light transmitting rod 22 can be guided to a prescribed position by means of these light guides 36a and 36b so that the direction of the primary light beam can arbitrarily be controlled, whereby it becomes possible to emit the primary light beam to a predetermined position.

In these examples, it is, of course, not necessary to cover the light transmitting rod 22 with a cylindrical mirror 30 with a slit or to provide a rod lens 46, the reflecting mirror 112 and the like as its condenser.

Figure 12:
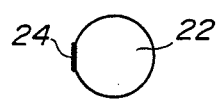
FIGS. 12 and 13 are views each showing another profile in section of the light transmitting rod.
Figure 13:
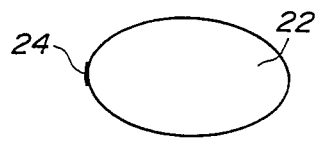

Moreover, the section of the light transmitting rod 22 is not limited to a circle, but a substantially circular section having a flat portion to which is to be applied a diffusion stripe 24 or a section having a quadratic surface such as an elliptical section and the like as shown in FIGS. 12 and 13 may suitably be selected.

The manner of introducing light from the lamp 44 to the light transmitting rod 22 is not limited to that described in the present embodiment, but such a manner in which the lamp 44 is connected with the light transmitting rod 22 by means of an optical fiber, a quartz rod or the like, and light from the lamp 44 is guided through said optical fiber, quartz rod or the like may, of course, be applied. In this case, light may be easily introduced even if the lamp 44 is apart from the light transmitting rod 22, even if they are curved, or even if the positions of them slip out of place with respect to one another.

INDUSTRIAL APPLICABILITY

As described above, the light source unit according to the present invention comprises a base to be attached to an apparatus, a light transmitting rod supported by said base and provided with a reflecting mirror at an end surface thereof, a diffusion stripe formed by applying fine powder having a high refractive index to the outer circumferential surface of said light transmitting rod in a rectilinearly pin-striped manner along the axial direction thereof, and a lamp mounted on the other end of said light transmitting rod and emitting light onto said other end thereof. Thus, according to the present invention, irradiation light composed of an even linear light profile of uniform luminous energy and no polarization, i.e. light having a small light distribution beam angle and of substantially parallel rays, can be obtained. Also, the entire construction of the light source unit can be miniaturized, and light transmission length can be increased at a low voltage. In addition, it is possible to shorten the time for exchanging the lamp.

Furthermore, since the light source unit of the present invention utilizes no tubular electric lamp, it is possible to improve irradiation efficiency, power consumption decreases in said light source unit, and near infrared rays and infrared rays of irradiation light can be removed. Besides, a light source having a desired length such as that in continuous form can easily be obtained in accordance with the present invention.

While the present invention has been described with reference to the foregoing embodiments, many changes and modifications may be made thereto which fall within the scope of the appended claims.

We claim:

1. A light source unit for a business machine, said light source unit comprising:
   means for generating irradiation light with a small light distribution beam angle of substantially parallel rays for providing an even linear light profile of uniform luminous energy, said means including:
   a base having means for being attached to a business machine;
   a light transmitting rod attached to and rotatably supported by said base, said light transmitting rod having first and second axial ends, and said first axial end having a reflecting mirror attached thereto;
   a diffusion stripe of fine powder having a high refractive index, said diffusion stripe being disposed on a portion of an outer circumferential surface of said light transmitting rod, and said diffusion stripe extending rectilinearly along the length of said rod in the axial direction of said light transmitting rod;
   a light-emitting lamp disposed adjacent to said second axial end of said light transmitting rod for causing light emitted from said lamp to pass into said second axial end of said light transmitting rod; and
   a cylindrical mirror having a reflecting surface thereon and facing radially inwardly, said cylindrical mirror substantially surrounding said light transmitting rod, said cylindrical mirror having an axially extending slit therein, said slit being disposed adjacent to a portion of said circumferential surface of said light transmitting rod diametrically spaced opposed to said diffusion stripe for causing light emitted from said lamp into said light transmitting rod and reflected within said light transmitting rod by said reflecting mirror, reflected by peripheral surfaces of said light transmitting rod, and reflected by said diffusion stripe to be transmitted radially out of said light emitting rod through said slit as irradiation light with a small light distribution beam angle of substantially parallel rays.

2. A light source unit as claimed in claim 1, wherein a light guide is disposed adjacent to the slit of said cylindrical mirror.

3. A light source unit as claimed in claim 1, wherein said light transmitting rod is of a material selected from the group consisting of silica glass, optical glass, silicone resin, and acrylic resin.

4. A light source unit for a business machine, said light source unit comprising:
   means for generating irradiation light with a small light distribution beam angle of substantially parallel rays for providing an even linear light profile of uniform luminous energy, said means including:
   a base having means for being attached to a business machine;
   a light transmitting rod attached to and rotatably supported by said base, said light transmitting rod having first and second axial ends, and said first axial end having a reflecting mirror attached thereto;
   a diffusion stripe of fine powder having a high refractive index, said diffusion stripe being disposed on a portion of an outer circumferential surface of said light transmitting rod, and said diffusion stripe extending rectilinearly along the length of said rod in the axial direction of said light transmitting rod;
   a light-emitting lamp disposed adjacent to said second axial end of said light transmitting rod for causing light emitted from said lamp to pass into said second axial end of said light transmitting rod;
   a cylindrical mirror having a reflecting surface thereon and facing radially inwardly, said cylindrical mirror substantially surrounding said light transmitting rod, said cylindrical mirror having an axially extending slit therein, said slit being disposed adjacent to a portion of said circumferential surface of said light transmitting rod diametrically spaced opposed to said diffusion stripe for causing light emitted from said lamp into said light transmitting rod and reflected within said light transmitting rod by said reflecting mirror, reflected by peripheral surfaces of said light transmitting rod, and reflected by said diffusion stripe to be transmitted radially out of said light emitting rod through said slit as irradiation light with a small light distribution beam angle of substantially parallel rays; and
   a condenser disposed adjacent to said light transmitting rod for condensing the light emitted radially from said light transmitting rod.

5. A light source unit as claimed in claim 1, wherein a light guide is disposed adjacent to the slit of said cylindrical mirror.

6. A light source unit as claimed in claim 1, wherein said light transmitting rod is of a material selected from the group consisting of silica glass, optical glass, silicone resin, and acrylic resin.

* * * * *